June 9, 1936.  J. MIHALYI  2,043,902
AUTOMATIC FILM WINDOW SHUTTER
Filed Aug. 1, 1935
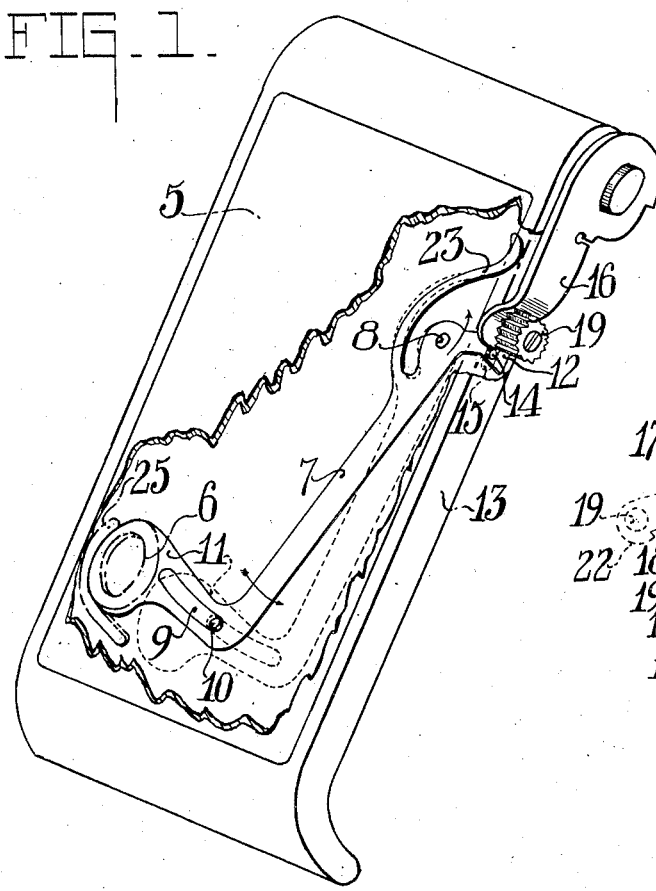
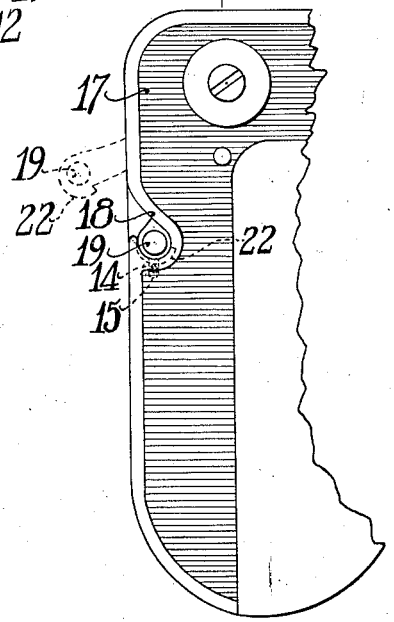
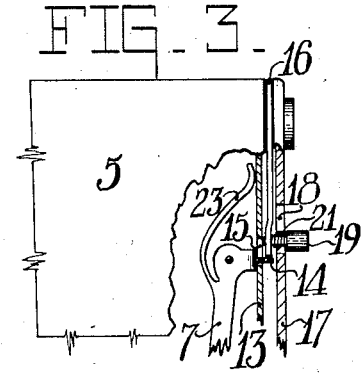
INVENTOR.
Joseph Mihalyi,
BY
ATTORNEYS.

Patented June 9, 1936

2,043,902

UNITED STATES PATENT OFFICE 2,043,902

AUTOMATIC FILM WINDOW SHUTTER

Joseph Mihalyi, Rochester, N. Y., assignor to Eastman Kodak Company, Rochester, N. Y., a corporation of New York Application August 1, 1935, Serial No. 34,213

10 Claims. (Cl. 95—31)

This invention relates to photography and more particularly to a shutter for the window in a camera back through which the exposure numbers are viewed, the function of said shutter being to cover the film window against the admission of light rays during the periods when the examination of the exposure numbers is not required.

It has been common practice in connection with roll film cameras to have a suitable opening or window in the camera back through which the exposure numbers on the film backing strip can be viewed in order to allow the operator of the camera to correctly position the successive picture area after each exposure. Although the film strip was provided with a backing strip which aided in preventing any light rays entering this window from fogging the film itself, it was found necessary to cover the window with a piece of colored celluloid, usually ruby red, in order to cut out the actinic rays of light passing through the film window. This type of covering for the film window served its purpose sufficiently well for a time, but as the sensitivity of the emulsions on the film strips was increased, it was found that this ruby window failed to cut out the light rays completely enough to prevent film fog so a green window was substituted, and in some cases where the more sensitive films were supplied, a piece of black adhesive tape was packed with each roll of film to be used for covering the film window between exposures. The green window proved satisfactory for the more sensitive films as long as any one picture area was not left in exposing position too long, but if a fresh area of film was turned into the exposing position and the camera was laid aside for an extended length of time before this picture area was exposed, it was found that an appreciable amount of fogging took place and in some cases the particular picture area was spoiled.

To overcome this difficulty it was found necessary to provide some means by which the film window in the camera back could be completely covered against the passage of light between successive exposures, particularly when these successive exposures are interrupted for an extended period of time.

Therefore, one object of my invention is to provide an automatic film window shutter which will completely close the film window against the passage of light rays and thereby prevent film fog during extended interruptions between successive exposures.

Another object is to provide an automatic film window shutter which is controlled by the film winding means so that the film window will be automatically uncovered before the film strip can be advanced.

And still another object is to provide an automatic film window shutter which will be efficient, simple, and compact enough to fit within the camera back so that its mechanism will be invisible from the outside of the camera.

Briefly, this invention consists of a shutter yoke which is pivoted in the camera back to swing into and out of covering position with respect to the film window. The shutter yoke is provided on one end with a pin which extends through a suitable slot in the wall of the camera back and into the path of the film winding handle. The shutter is normally spring pressed to the uncovering position so that when the winding handle is moved to winding position, the pin on the shutter is released thereby and allowed to move to the top of the slot in the camera wall as the shutter uncovers the window. The end of the film winding handle is provided with a cam face so that when it is returned to the carrying position, it contacts the pin on the shutter yoke, forcing it to the lower end of the slot in the wall of the camera back to effect a closure of the film window shutter.

The novel features that I consider characteristic of my invention are set forth with particularity in the appended claims. The invention itself, however, both as to its organization and its method of operation, together with additional objects and advantages thereof, will best be understood from the following descriptions of specific embodiments when read in connection with the accompanying drawing, in which:

Fig. 1 is a perspective of a roll film camera back, the camera back being broken away to clearly show the linkage of the shutter yoke and its cooperation with the film winding means—

Fig. 2 is an end elevation of the camera back showing the two positions of the winding handle for the film, and Fig. 3 is a rear view of a corner of the camera back, a portion of the back being broken away to more clearly show the cooperation between the winding handle and the pin on the shutter yoke.

Like references refer to corresponding parts in all of the figures.

In Fig. 1, 5 shows an ordinary camera back for a roll film camera which is provided with the usual film window 6 through which the exposure numbers on the film backing strip are viewed by the operator of the camera. In the camera back 5, I pivotally mount a shutter yoke 7 as shown at 8, so that it is free to swing in an arc, the length of which is governed by the length of the arcuate slot 9 in the shutter yoke 7, said accurate slot 9 acting as a guiding and mounting means for the shutter yoke 7 in conjunction with a pin 10 which is fastened to the camera back 5. I wish to point out that throughout this application when I refer to a shutter, I am referring only to a device for covering the film window in a camera back and not another camera part that usually is known by that name, and which is used for controlling the amount of light entering the camera bellows for exposing the film.

To completely cover the film window 6 in the camera back, one end of the shutter yoke 7 is of such a shape and size, as shown by 11, to completely cover the window 6 and even overlap it when the shutter is in the closed position, as shown in Fig. 1. The opposite end of the shutter yoke 7 terminates in an angle portion 12, the face of which is parallel with the wall 13 of the camera back. On the face of this angle portion 12, a pin 14 is mounted, said pin being of sufficient length to extend through the slot 15 in the wall of the camera back and into the path of the film winding handle 16, when said handle is in carrying position. The radius of the arc scribed by that portion of the shutter yoke covering the film window to the radius of the arc scribed by the pin 14 is such that the path of the pin 14 in moving from a covering to an uncovering position of the shutter is relatively short and substantially parallel to the wall of the camera back.

The winding means in connection with which I have chosen to show my device differs from the ordinary winding means for a roll film camera in that, instead of the film advancement being affected by complete revolutions of the winding handle 16 it is accomplished by reciprocating the winding handle 16 through substantially 180°. Fig. 2 clearly shows the winding handle 16 in carrying position, and also shows an end elevation of the camera back with the side plate 17 in position. This plate 17 encloses the side of the camera back 5, and is so spaced from the wall 13 of the camera back that ample space is provided for the operation of the winding handle 16, as shown most clearly in Fig. 3. This side plate 17 is provided with a pocket 18 into which the knob 19 of the winding handle 16 is adapted to fit. This pocket 18 is provided with a protruding portion 20 which extends up into the entrance to the pocket a sufficient distance to prevent the winding handle 16 being brought into carrying position until the knob 19 is pulled out against the spring 21 a sufficient amount to pass over the thickness of the end plate 17 and snap into the pocket 18, as shown most clearly in Fig. 3. It is in this carrying position that the cam portion 22 on the end of the winding handle 16 contacts the pin 14 on the shutter yoke and forces it down in the slot 15 in the wall of the camera back and effects a covering of the film window 6 by the end 11 of the shutter yoke 7.

To effect an automatic opening of the film window 6 in the camera back preparatory to the winding of the film, I provided a spring pressing means 23 which normally tends to force the shutter yoke to the open position when the winding handle 16 is removed from the carrying position for advancing the film strip. For the sake of simplicity and cheapness, I have shown the spring pressing means 23 for the shutter yoke 7 as being blanked out of some piece as the yoke 7, but it is to be understood any suitable form of spring pressing means may be substituted without deviating from the spirit of my invention. Before the film window 6 can be opened or the film can be wound, it is imperative that the knob 19 on the winding handle 16 be pulled out against the spring 21 a distance equal to the thickness of the end plate 17 to allow it to pass over the protruding position 20 of the pocket 18. This step releases the cam face 22 on the winding handle from engagement with the pin 14 on the shutter yoke, and the pin 14 moves up in the slot 15 in the wall 13 of the camera back under the tension of the spring 23 which is normally tending to swing the shutter yoke 7 to the uncovering position. In order to insure a more satisfactory covering of the film window against the admission of light, I have shown the film window in the camera back 5 partially encircled by a seating ring 25, which may be fastened to the camera back in any suitable way and whose function it is to receive the film window covering portion 11 of the shutter yoke 7 in such a way as to effect a light tight joint between the two members. It is evident that the amount to which this seating ring 25 can encircle the film window 6 in the camera back is governed solely by the path of the 25 covering portion 11 of the shutter yoke 7.

From the above description of the apparatus in conjunction with the drawing, it is evident that the winding handle 16 must be released from its carrying position before the film can be advanced, and this limitation provides the assurance that the film window will be uncovered before the film can be wound. After the winding handle has once been released from its carrying position, it is possible to advance the film any amount without interfering with the shutter for the film window due to the reciprocating action of the film winding handle instead of the ordinary revolving type of winding means. Although this device is not absolutely foolproof against having the film window open between extended interrupted exposures, it does provide a simple and convenient means by which a person can knowingly close the film window between successive exposures to prevent film fog with the more sensitive film, and if the operator correctly closes his camera to carrying position, it does guarantee a closure of the film window.

Although I have shown and described certain specific embodiments of my invention, I am fully aware that many modifications thereof are possible. My invention, therefore, is not to be restricted except in so far as is necessitated by the prior act and by the spirit of the appended claims.

Having thus described my invention, what I claim is new and desire to secure by Letters Patent of the United States is:

1. In a roll film camera equipped with a window for viewing the exposure numbers on the film backing strip the combination with a winding means for advancing said film strip, of a shutter for covering and uncovering said window, means for controlling the position of said shutter adapted to be actuated by said winding means.

2. In a roll film camera equipped with a window for viewing the exposure numbers on the film backing strip, the combination with a winding means for advancing said film strip, of a shutter for covering and uncovering said window, spring pressing means normally forcing said shutter toward the uncovering position with respect to said window, and a portion of said shutter extending into the path of said winding means for engagement therewith, said engagement effecting a closure of said shutter against said spring pressing means in the inoperative position of said winding means.

3. With a roll film camera provided with a window for viewing the exposure numbers on the film backing strip the combination of a winding means for advancing the film strip, a shutter for covering and uncovering said window said shutter normally spring pressed toward the uncovering position, a pin on said shutter extending through the wall of the camera back and into the path of said winding means, and a cam portion on said winding means adapted to engage said pin and hold the shutter in covering position with respect to said window when said winding means is in the carrying position.

4. In a roll film camera having a window for viewing the exposure numbers on the film backing strip the combination of a shutter for covering and uncovering said window, of a winding means for advancing said film strip, suitable means on said shutter extending into the path of said winding means for engagement therewith, said engagement insuring the covering of the film window while said advancing means is in its inoperative position.

5. In a roll film camera having a window in its back for viewing the exposure numbers on the film backing strip, the combination of a winding means for advancing said film strip, a shutter pivotally mounted in said back to swing into and out of covering position with respect to said window, resilient means normally forcing said shutter into an uncovering position with respect to said window, a pin on said shutter extending into the path of the film winding means for engagement therewith when said winding means is in the carrying position, the engagement between said winding means and said pin adapted to force the shutter into covering position against the action of said resilient means.

6. In a roll film camera having a window in its back for viewing the exposure numbers on the film backing paper, the combination of a winding means for advancing the film from the supply spool to the takeup spool, a shutter for covering and uncovering said window in the camera back, said shutter normally forced into the uncovering position, and suitable means on said shutter cooperating with the film winding means for closing said shutter when said winding means is in carrying position.

7. In a roll film camera having a window in its back for viewing the exposure numbers on the film backing paper the combination of a winding means for advancing the film strip from the supply spool to the take-up spool, a shutter for covering and uncovering said window in the camera back, said shutter being normally spring pressed to the uncovering position, a pin on said shutter extending through a slot in the wall of the camera back and into the path of said winding means, said pin adapted to be acted upon by said winding means to force the shutter into closing position when the winding means is placed in carrying position.

8. In a roll film camera having a window in its back for viewing the exposure numbers on the film backing paper and winding means for advancing said film, a shutter pivoted in said camera back for covering and uncovering said window, resilient means normally forcing said shutter into position for uncovering said window, a portion of said shutter extending through a slot in the wall of said camera back and into the path of said winding means for cooperation therewith, said cooperation forcing said shutter into covering position with respect to said window when said winding means is placed in carrying position.

9. In a camera adapted for taking a series of exposures, the combination of suitable means for advancing the film through said camera, a window for viewing the exposure numbers on the film backing paper, a shutter for closing and opening said window, and suitable means on said shutter adapted to be actuated by said film advancing means in the carrying position thereof for forcing said shutter into closing position.

10. In a roll film camera having a window in its back for viewing the exposure numbers on the film backing paper, the combination of a winding means for advancing the film strip from the supply spool to the take-up spool, a shutter yoke pivoted to swing in said camera for back covering and uncovering said window in the camera back, a seating ring located on said camera back and partially encircling said window therein, said seating ring adapted to receive said shutter yoke and form a light tight joint therewith, resilient means normally pressing said shutter yoke toward the uncovering position, and a pin on said shutter yoke extending through a slot in the wall of the camera back and into the path of the film advancing means said pin adapted to be acted upon by said winding means to force the shutter into closing position when the winding means is placed in carrying position.

JOSEPH MIHALYI.

CERTIFICATE OF CORRECTION.

Patent No. 2,043,902.  June 9, 1936.

JOSEPH MIHALYI.

It is hereby certified that error appears in the printed specification of the above numbered patent requiring correction as follows: Page 3, second column, line 41, claim 10, after the word "camera" strike out "for" and insert the same after "back", same line and claim; and that the said Letters Patent should be read with this correction therein that the same may conform to the record of the case in the Patent Office.

Signed and sealed this 29th day of September, A. D. 1936.

Henry Van Arsdale (Seal)  Acting Commissioner of Patents.